Sept. 23, 1958 D. L. NETTLETON ET AL 2,853,698

COMPRESSION SYSTEM

Filed Sept. 23, 1955 3 Sheets-Sheet 1

INVENTORS.
Grant W. Booth,
David L. Nettleton &
Arthur D. Beard
BY Morris ... [signature]
ATTORNEY.

INVENTORS.
Grant W. Booth,
David L. Nettleton &
Arthur D. Beard
BY Morris B. Rabkin
ATTORNEY.

INVENTORS
Grant W. Booth,
David L. Nettleton &
Arthur D. Beard
BY Morris Rabkin
ATTORNEY.

2,853,698

COMPRESSION SYSTEM

David L. Nettleton, Haddonfield, Grant W. Booth, Collingswood, and Arthur D. Beard, Haddonfield, N. J., assignors to Radio Corporation of America, a corporation of Delaware Application September 23, 1955, Serial No. 536,200

15 Claims. (Cl. 340—174)

This invention relates to information handling systems, and particularly to information storage systems.

The present invention is generally applicable to information storage systems. A word in an information handling system may be defined as an ordered set of characters considered as a unit. The word length is defined as the number of characters contained in the word. Although useful in any information storage system, the present invention has special utility in variable word-length systems. Variable word-length systems are particularly useful in handling business data wherein a word may represent a multi-digit number, a name, or any desired combination of characters. A computer system employing variable word lengths is described in Patent No. 2,679,638 issued to Lowell S. Bensky and Arthur D. Beard, May 25, 1954, and entitled Computer System.

An object of the present invention is to provide an improved means for storing information in the internal memory of an information handling system.

Still another object of the present invention is to provide an improved means for rearranging in a more compact form information initially stored in the internal memory of an information handling system.

Yet another object of the present invention is to improve the efficiency of transfer of information from the internal memory of a computer or other information handling system to an external storage means.

In information handling systems, the information is usually stored in a large capacity external memory such as magnetic tape. A group of words may be selected and read from the external memory to a small capacity internal memory of relatively higher speed than the external memory. The internal memory makes desired ones of the words more speedily available to the system. After the selected information is processed, or no longer required, it may be read out to the external memory and replaced by a new group.

A predetermined number of memory locations of the internal memory is allotted for storing the various words transferred from the external storage. It is known, however, that on an average the number of characters in a word is less than the predetermined allotted number. A group of words may be treated as an entity and termed a "message." Special symbols or characters may be used for identifying the start and the end of a message and for separating successive words in a message. The allotted predetermined number of memory locations is preserved in the prior art systems throughout the processing operations and in reading out the stored information to the external storage.

According to the present invention, information stored in the internal memory of an information handling system is rearranged so that in most instances the same information is stored in fewer memory locations. More particularly, means are provided for interrogating successive ones of the memory locations between any two given memory addresses. Each successive memory output from the interrogated locations is detected, and either reentered into the memory beginning with a given address, which may be different from either one of the other two addresses, or discarded under the control of circuit means responsive to the detecting means.

Selected groupings of characters may thus be taken from different portions of the internal memory and assembled in a compact form in another portion of the internal memory. The compressed information may be read out to an external storage means such as an output tape where the length of tape and the time required for storing the information are greatly reduced.

The invention will be more fully understood, both as to its organization and method of operation, from the following description when read in connection with the accompanying drawings, and in which.

Figure 1:
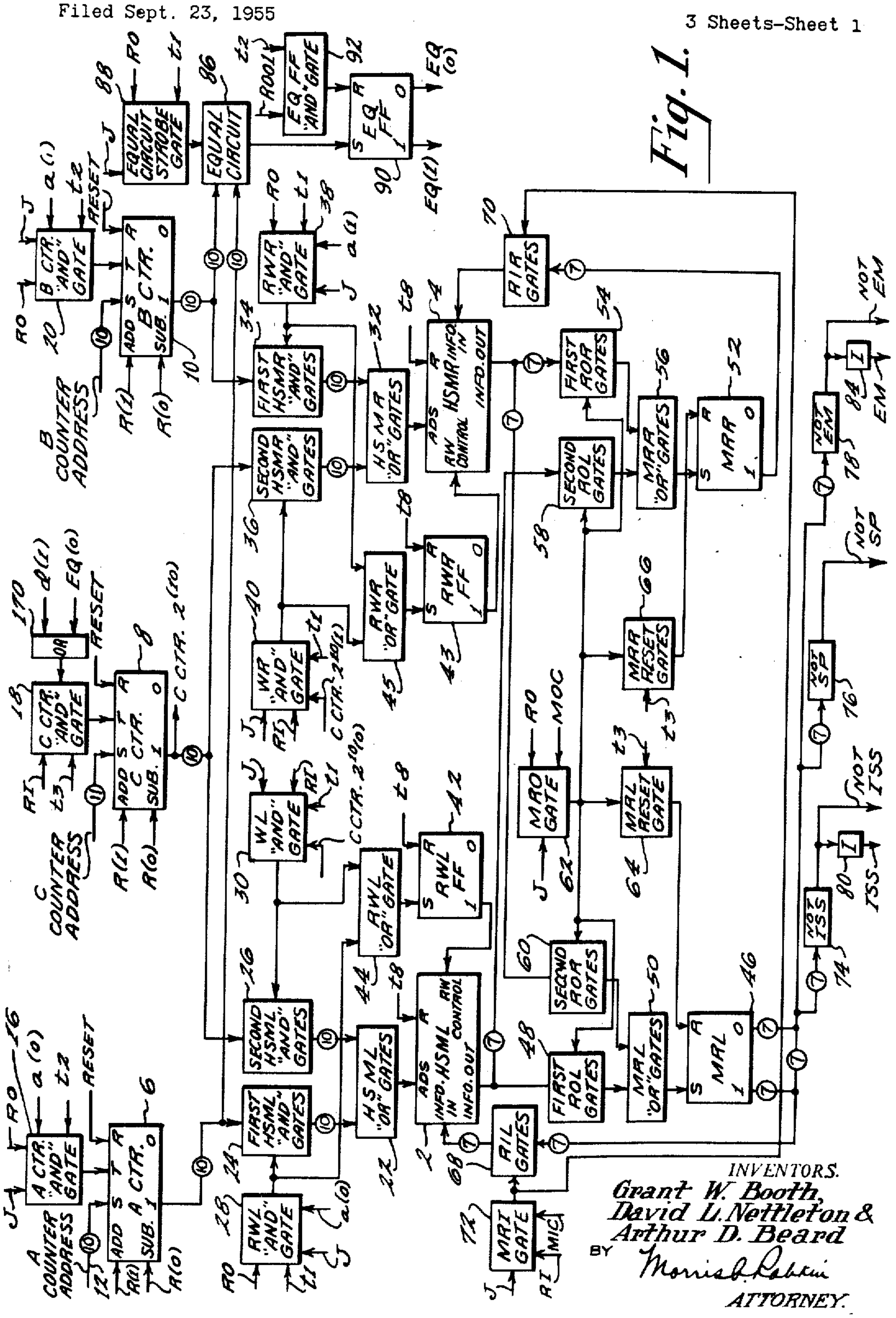
Fig. 1 is a schematic diagram of a sufficient portion of an information handling system embodying the invention to afford a clear understanding of the invention.

The present invention may be employed in an information handling system such as the three-address computing system described in an application by Lowell S. Bensky, Serial No. 478,021, filed December 28, 1954, and entitled Information Handling System. Only those portions of the memory system and associated circuitry of a suitable computer are described which afford a clear understanding of the present invention.

The information to be rearranged may be located in either one of two high-speed memories HSML (high-speed memory left) 2 and HSMR (high-speed memory right) 4 of a memory system of a suitable computer. In this instance, the computer is assumed to have two memories, and to employ a three-address system. However, the two memories may be two different sections of a larger memory. The units of information may have been initially stored in an external storage device such as a magnetic tape. Any suitable known means may be employed for reading the units of information into desired ones of the memory locations. For the purpose of handling the information, it is convenient to provide separate control circuits for the memory sections. Thus, in computing operations one operand may be placed in HSML2 and the other operand may be placed in HSMR4. The two operands then may be read out of the two memories simultaneously. The memories 2 and 4 may, for example, be random access magnetic core memories of any known type. A system for operating a random access, coincident current, magnetic core memory is described in an article entitled "The MIT magnetic-core memory" by William N. Papian, published in the Proceedings of the Eastern Joint Computer Conference (1953), page 37. The HSML2 and HSMR4 memories may be arranged and operated similar to the memory described in the article. The invention, however, is applicable to other known types of memory devices such as electrostatic storage tube types.

Because both the memories 2 and 4 are similar, only the connections for operating the HSML2 are described in detail. The HSML2 illustratively has seven 32 x 32 memory planes arranged as described in the Papian article. A seven binary digit (bit) code is used in the present invention for encoding the information. Six of the bits are sufficient for representing the decimal numbers 0–9, the alphabetic letters and certain special symbols. The seventh bit is used as a parity check bit. A different bit of the seven bits of a character is stored in a corresponding location in a different one of the seven memory planes.

Each character is read into and read out of HSML2 in parallel. Ten binary digits (each designated as corresponding to one of the ten orders or positions $2^0$ to $2^{10}$ in a binary digit) are sufficient for designating any given one of the 1024 locations (addresses) of the HSML2. The ten binary digits are staticized in an address register (Ads) (not shown) which is a part of the HSML2. The address registers (Ads) and the other registers employed herein may be conventional flip-flop storage registers. The ten binary digits are furnished in parallel to the corresponding flip-flop stages of the (Ads) register. One half of the (Ads) register outputs are applied to an X decoder matrix (not shown) and the other half of the (Ads) register are applied to a Y decoder matrix (not shown). The X and Y matrices are part of the internal memory circuitry and are used for selecting one out of 32 outputs in accordance with the digits stored in the (Ads) register. The internal memory circuitry may be similar to that described in the above-mentioned Papian article. Each selected output of the X and Y decoder matrices is used for enabling the read and the write drivers associated with the desired memory addresses. The enabled read and write drivers may be operated sequentially by means of timing signals described hereinafter.

The ten binary digits representing the desired HSML2 memory address are furnished as described hereinafter by either an A address counter 6 or a C address counter 8; the ten binary digits representing the desired HSMR4 memory address are furnished by either the C address counter 8 or a B address counter 10. The A, C and B address counters, 6, 8 and 10 may be known reversible binary counter arrangements. Suitable binary counters may comprise a chain of flip-flop stages connected in cascade. Each of the flip-flop stages has a set (S) and a reset (R) input and corresponding "1" and "0" outputs. The flip-flops are connected in a chain by connecting an output of one flip-flop to a trigger input "T" of the next succeeding flip-flop. A signal applied to the trigger input of a flip-flop reverses the state of the flip-flop. The various set and reset inputs and the various "1" and "0" outputs of the counters are collectively illustrated in the drawing by S and R, and "1" and "0" designations, respectively.

The binary number representing the address of the desired memory location may be set into the A counter 6 in parallel (simultaneously) by applying a suitable pulse combination on respective ones of the ten input leads, collectively represented by a line 12 connected to the S input of the A counter 6. The number of leads represented by the line 12 is indicated by the inscribed circle having the designation 10 therein. A similar scheme is used throughout the drawing in designating multi-conductor lines where the number inscribed in the line indicates the number of conductors connected to a given unit. The reset input of each flip-flop stage of the various counters is connected to a common reset line.

The counters 6, 8 and 10 may be used for counting in an ascending or a descending mode in accordance with a voltage applied to either an add input or a subtract (Sub) input of the counter. When the counter is placed in an add mode, a count of one is added to the count each time a pulse is applied to the trigger input T of its lowest order stage; in the subtract mode, a count of one is subtracted from the count each time a pulse is applied to the trigger T input. The C counter 8 and the B counter 10 are each similar to the A counter 6 with the exception that the C counter 8 is provided with 11 flip-flop stages. The first ten stages of the C counter 8 are used for addressing the memory sections. The eleventh stage ($2^{10}$) is used for selecting one of the HSML2 and HSMR4 memories as described hereinafter.

Pulses are directed to the trigger input T of the A, the C and the B counters 6, 8 and 10 under the control of the A, C and B counter "and" gates 16, 18 and 20, respectively.

The memory addresses represented in the A counter 6 and the C counter 8 are directed to the HSML2 address register (Ads) through a set of HSML "or" gates 22 under the control of a first and a second set of HSML "and" gates 24 and 26, respectively. The HSML "or" gates 22 are a set of 10 separate two-input "or" gate circuits. One of the two inputs of each "or" gate circuit is connected to a corresponding one of the outputs of the first HSML "and" gates 24; and the other of the two inputs of each "or" gate circuit is connected to a corresponding one of the outputs of the second HSML "and" gates 26. The "and" and the "or" gate circuits employed herein are known in the art and may be comprised of a plurality of diode rectifiers suitably interconnected.

The first and second HSML "and" gates 24 and 26 each comprises a set of ten separate two-input "and" gate circuits. One input of each set of "and" gate circuits of the first HSML "and" gates 24 is primed by the output of a RWL (read-write left) "and" gate 28; and separate ones of the second inputs of the "and" gate circuits are connected to respective ones of the "1" outputs of the A counter 6. One input of each "and" gate circuit of the second HSML "and" gates 26 is primed by a WL (write left) "and" gate 30; and separate ones of the second inputs are connected to respective ones of the "1" outputs of the C counter 8.

The memory address represented in the B counter 10 and the C counter 8 are directed to the HSMR4 address register (Ads) through a set of HSMR "or" gates 32 under the control of a first and a second set of HSMR "and" gates 34 and 36, respectively. One input of each "and" gate circuit of the first HSMR "and" gates 34 is primed by the output of a RWR (read-write right) "and" gate 38; and separate ones of the second inputs of the "and" gate circuits are connected to respective ones of the "1" outputs of the B counter 10. One input of each "and" gate circuit of the second HSMR "and" gates 36 is primed by a WR (write right) "and" gate 40; and separate ones of the second inputs of the "and" gate circuits are connected to respective ones of the "1" outputs of the first 10 stages of the C counter 8.

The output signal of the RWL (read-write left) "and" gate 28 and the WL (write left) "and" gate 30 are connected to the set input of a RWL flip-flop 42 through a two input RWL "or" gate 44. The RWL flip-flop 42 is used to supply a voltage level which is used in operating the read-write drivers of the memory during a read-write cycle. Conveniently, the "1" output of the RWL flip-flop can be used to prime two pairs of two-input "and" gates (not shown) which may be part of the internal memory circuitry. One "and" gate pair is connected between the X matrix and its associated read and write drivers and the other pair of "and" gates is connected between the Y matrix and its associated read and write drivers. One "and" gate of each pair is activated by the "1" output of the read flip-flop and the other "and" gate of each pair is activated by the write flip-flop. The last mentioned read and write flip-flops are a part of the internal memory and are operated by timing signals to be described.

Figure 4:
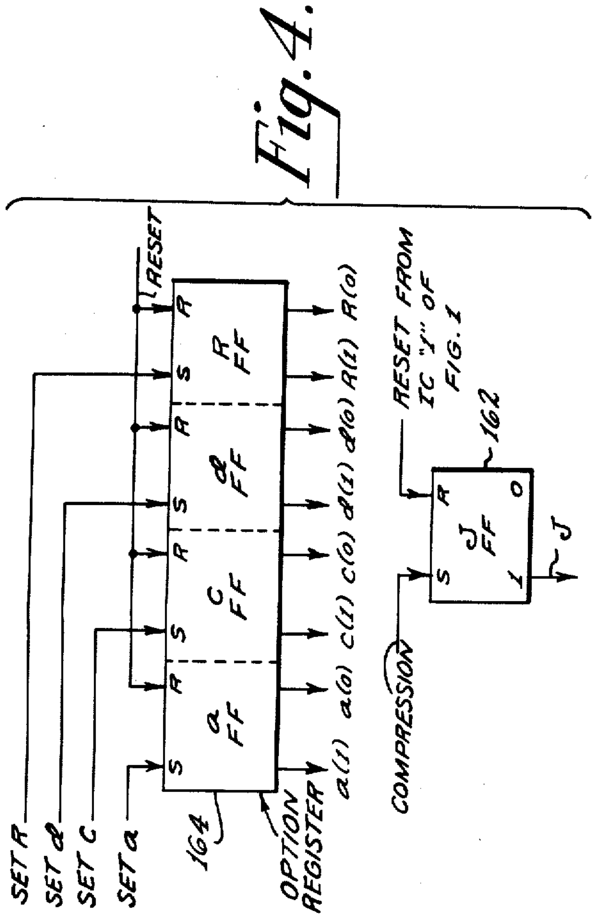
Fig. 4 is a block diagram of an arrangement for obtaining various enabling levels, called variation levels, useful in the system of Fig. 1.

The memory cores corresponding to the address set into the address register (Ads) are first interrogated by first operating the read drivers associated with the set memory address, and then operating the write drivers associated with the set memory address as by sequentially setting and resetting the read and write flip-flops of the internal memory. During the write pulse, an inhibit pulse is applied to those memory planes in which it is desired to write a binary one, as by setting a corresponding one of the inhibit flip-flops which are part of the internal memory circuitry. The memory cycle may be similar to that shown in Fig. 4 of the Papian article.

The information read out of the memory during the read portion of the memory cycle is staticized in a flip-flop register MRL (memory register left) 46. The MRL 46 register may comprise seven flip-flop stages. The information read out of HSML 2 is directed in parallel to the set inputs of MRL 46 through a first set of ROL (read out left) "and" gates 48 and a set of MRL "or" gates 50. The first ROL "and" gates 48 may comprise a set of seven different two-input "and" gate circuits, one corresponding to each bit of a character and the MRL "or" gates may comprise a set of seven two-input "or" gates.

The information read out of the HSMR 4 during the read cycle is staticized in a second flip-flop register MRR (memory register right) 52. The information read out of HSMR 4 is directed to the set inputs of the MRR 52 by means of a set of first ROR (read out right) "and" gates 54 and a set of "or" gates MRR 56. The information read out of HSML 2 and HSMR 4 is cross-coupled to the MRR and MRL registers 52 and 46, respectively, by means of a second set of ROL gates 58 and a second set of ROR gates 60. The outputs of the second ROR gates 60 are applied to corresponding set inputs of the MRL 46 through the MRL "or" gates 50. The outputs of the second ROL gates 58 are applied to corresponding set inputs of the MRR 52 through the MRR "or" gates 56.

The first and second ROL gates 48 and 58, and the first and second ROR gates 54 and 60 are each controlled by the output of a three-input MRO (memory read-out) "and" gate 62. The MRO gate 62 also controls the reset of the MRL and MRR registers 46 and 52 by means of a MRL reset gate 64 and a MRR reset gate 66, respectively. The MRL and MRR gates are each two-input "and" gate circuits.

The information written into the memories during the write portion of the memory cycle is taken from the corresponding "1" outputs of the MRL register 46 under the control of a set of RIL (read-in left) "and" gates 68. The information written into the HSMR 4 during the write portion of the memory cycle is taken from the "1" outputs of the MRR register 52 under the control of a set of RIR (read-in right) "and" gates 70. The RIL and RIR gates 68 and 70 are controlled by the output of a three-input MRI (memory read-in) gate 72.

During operation, certain special symbols are used in controlling the routing of the information to and from the memories. Each of these special symbols is represented by a unique combination of seven binary digits. Three special symbols are of interest in the present embodiment, and are as follows: the ISS (item separator symbol), the SP (space symbol), and the EM (end message symbol). Three recognition gates are employed, each responsive to a particular combination of "1" and "0" outputs of the MRL register 46. The recognition gates are termed the "Not ISS" (item separator symbol) recognition gate 74, the "Not SP) (space) recognition gate 76 and the "Not EM" (end message) recognition gate 78. Signal inverters (I) 80 and 84 are coupled to the outputs of the recognition gates 74 and 78, respectively. The recognition gates are used to "recognize" the absence of a particular signal combination representing the corresponding special symbol. Thus, in logical terms, the recognition gate may indicate by a high level output the absence of, for example, the ISS combination, that is the presence of the "Not ISS." To provide a signal indicative of the presence of an ISS signal combination, the output of the Not ISS gate is inverted. By way of example, the arrangement utilized may be as follows: If a signal combination 1100 staticized in MRL 46 is to be recognized, "or" together the MRL register outputs in the pattern 0011, using the complement of each binary digit of the signal to be recognized. The "or" circuit then provides a high level output except when the desired pattern 1100 is provided by the register. When the output is inverted, a high level output is provided only when the desired 1100 combination is present. Thus, the output of the inverters 80 and 84 represent the presence of the ISS, and the EM signal combinations, respectively. The inverters may be any suitable known type.

During operation, data is read from and written into only one of the high-speed memory sections at a time. The outputs of both the memory sections are staticized in MRL 46. Consequently, only the three rceognition gates are required for detecting the special symbols read out from both memory sections.

An equal circuit 86 is provided for furnishing an output signal under the control of an equal circuit strobe gate 88. When the count stored in the A and B counters 6 and 10 are equal, the equal circuit 86 passes the output signal of an equal circuit strobe gate 88 to the set input of an EQ (equal) flip-flop 90. The equal circuit 86 may be any suitable comparator device which furnishes an output signal upon the occurrence of equality of two binary numbers. The output of the comparator is then used to prime a two-input "and" gate (not shown) which is part of the equal circuit 86; the other input of this "and" gate is connected to the output of thte strobe gate 88. The output signal of the strobe gate 88 is passed to the set input of the EQ flip-flop 90 when the counts stored in the A and B counters 6 and 10 are equal. The comparator included in the equal circuit 86 may be any suitable comparator device such as, for example, the electronic comparator device described in Patent No. 2,615,127, issued to R. A. Edwards, October 21, 1952. The EQ flip-flop 90 is reset by the output signal of a two-input "or" gate termed the EQ flip-flop "or" gate 92.

In carrying out the compression operation, the system normally employs a succession of different status levels. Each status level represents a condition in which a certain predetermined group of components of the system are activated for transmitting or utilizing the information. The status levels may occur in a varying order, as the sequencing is in part controlled by the information read out of a memory section. Although the status levels may occur repetitively, each consumes a definite interval of time, for example 20 μsec. (microseconds).

The various status levels of interest of the present invention are identified as follows: RO01, RO04, RO, RI and IC. Each of these status levels is used for a particular function, or a number of functions as described hereinafter.

During each status level a succession of timing pulses occur. Each status level begins with a timing pulse *t1* shown in Fig. 3 and ends with a timing pulse *t8* or *t8a*. Each of the timing pulses *t1* through *t8a* is of 1 μsec. duration. The interval between the end of each timing pulse and the occurrence of the succeeding timing pulse is also 1 μsec., except that the interval between timing pulses *t4* and *t5* is 3 μsecs. The timing intervals given here are merely illustrative of time relationships which may be employed in practicing the invention.

Such a sequence of timing pulses may be derived from a timing pulse generator operating continuously. The timing pulse generator, for example, may include a magnetic drum which provides a series of timing pulses from a timing track approximately once every 20 μsecs. Other known timing pulse generators may include a series of delay lines responsive to the timing pulses furnished by the drum. Pulses in the above pattern, from *t1* to *t8a*, may be derived from taps taken in the series of delay lines.

Two other timing signals designated MOC (memory output clock) and MIC (memory input clock) are also employed during certain of the status levels. The timing signal MOC begins approximately at the same time as the timing pulse $t2$, and terminates shortly after the timing pulse $t4$; the timing signal MIC begins approximately at the same time as timing pulse $t5$ and ends approximately at the commencement of timing pulse $t8$. These two timing signals MOC and MIC may be derived from the basic sequence of timing pulses through the employment of gating, multi-vibrator and delay circuit arrangements.

Figure 2:
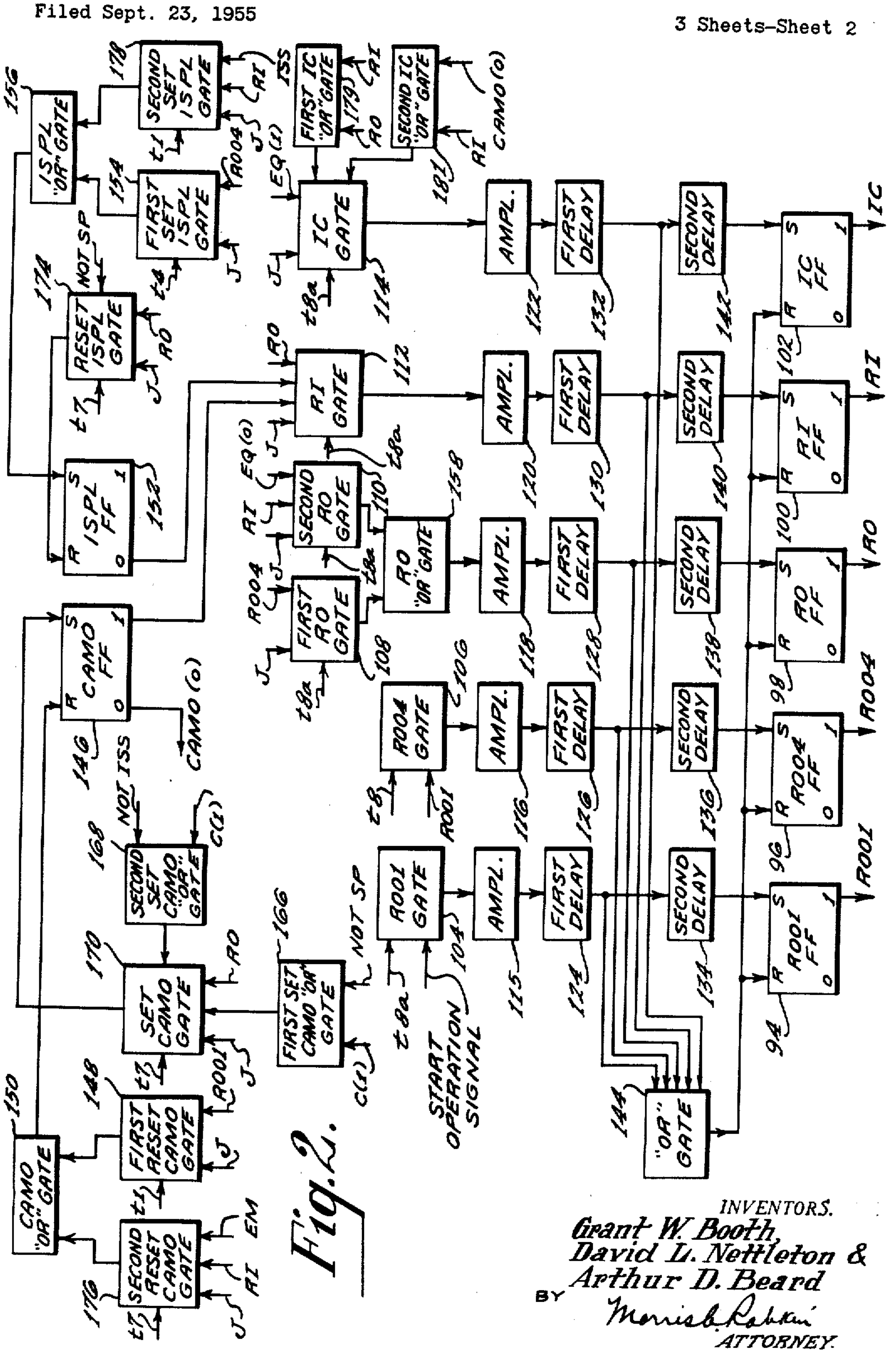
Fig. 2 is a schematic diagram of an arrangement which may be employed for obtaining certain enabling levels, called status levels, used in the system of Fig. 1.
Figure 5:
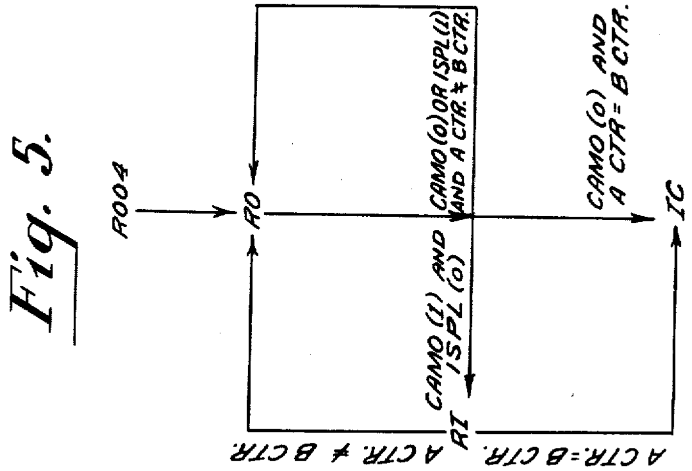
Fig. 5 is a flow diagram illustrating the selection of certain ones of the enabling levels of Fig. 4 under varying operating conditions.

An arrangement which may be employed for generating status levels in the desired sequence is shown in Fig. 2. A flow diagram showing the various changes of status levels is shown in Fig. 5. The changes of status levels will be described in detail in connection with the operation of the system.

The status level generator of Fig. 2 includes a number of flip-flop circuits 94 to 102, each of which is set by a different status gate 104, to 114. The "1" output of each of the status level flip-flops 94 to 102 represents one different status level, from RO01 to IC. Accordingly, each of the flip-flops 94 to 102 is designated as an RO01, or other, flip-flop. When any one of these flip-flops 94 to 102 is set, all others are reset, so that only one status level signal is provided at a given time. Not more than one of the number of status gates 104 to 114 provides a signal at a time.

The outputs of each of the status gates 104 to 114 is coupled to the set input of the corresponding status level flip-flop through a respective one of the pulse amplifier circuits 115 to 122, then through a respective one of the first delay circuits 124 to 132, and then through a respective one of the second delay circuits 134 to 142 to the corresponding status level flip-flop. The output of each first delay circuit 124 to 132 is connected to one of the inputs of a five-input "or" gate 144. The output circuit of the "or" gate 144 is applied in parallel to the reset input of each status level flip-flop 94 to 102. Thus, when one of the status level gates 104 to 114 furnishes an output signal, the one first delay circuit 124 to 132 connected to the one activated status level gate 104 to 114 furnishes an output signal which is passed through the "or" gate 144 to the reset input of each status level flip-flop 94 to 102, thereby resetting the one status level flip-flop previously set. The output signal of the one first delay circuit is delayed in the connected second delay circuit for a time required for the reset signal from the "or" gate 144 to reset the previously set status level flip-flop. The output signal of the one second delay circuit 124 to 132 is then applied to the set input of the status level flip-flop corresponding to the activated status level gate.

At the commencement of the compression operation, the first status level established is the RO01 status level during which a CAMO (change of mode) flip-flop 146 and the EQ flip-flop 90 (Fig. 1) are reset. The first status level flip-flop RO01 is initially set by applying a start operation signal (which may be the "1" output of the IC status level flip-flop, as described hereinafter) in coincidence with a timing pulse $t8a$ to the RO01 status gate 104. The RO01 status level activates a first reset CAMO gate 148 (Fig. 2) in coincidence with the enabling level J, corresponding to the compression instruction, and the timing pulse $t1$ of the RO01 timing pulse sequence. The output signal of the first CAMO gate 148 is passed through a CAMO "or" gate 150 to the reset input of the CAMO flip-flop 146. The RO01 status level primes the EQ "and" gate 92 (Fig. 1) and at timing pulse $t2$ of the RO01 sequence, the EQ "and" gate 92 is activated. The output of the EQ "and" gate 92 is applied to the reset input of the EQ flip-flop 90. The RO01 status level also primes the RO04 status gate 106 (Fig. 2) and at timing pulse $t8$ of the RO01 sequence, the RO04 status gate 106 is activated. The output of the RO04 status gate 106 then operates to reset the RO01 flip-flop 94 and to set the RO04 status level flip-flop 96.

The status level RO04 is used to set the ISPL (not item separator, not space) flip-flop 152 prior to operating the internal memory. The RO04 status level and the enabling level J prime a first set ISPL "and" gate 154 which is activated by the timing pulse $t4$ of the RO04 sequence. The output of the first set ISPL gate 154 is passed through a two-input ISPL "or" gate 156 to the set input of the ISPL flip-flop 150.

The RO04 status level and the enabling level J also prime the first RO status level gate 108 which is activated by the timing pulse $t8a$ of the RO04 sequence. The output of the first RO "and" gate 108 is passed through the RO "or" gate 158, the pulse amplifier 110, and the first and second delay circuits 128 and 138 to the set input of the RO status level flip-flop 98. The output of the first delay circuit 128 is passed through the "or" gate 144 to the reset input of the RO04 flip-flop 96.

During the RO status level, the information character stored in a desired one of the internal memory sections (Fig. 1) is read out to the associated memory register. The read-out can be achieved during the RO status level by setting the read flip-flop (not shown) included in the internal circuitry of the HSML 2, by the leading edge of timing pulse $t2$ of the RO sequence and resetting the read flip-flop by the trailing edge of timing pulse $t3$ of the RO sequence.

In accordance with the information contained in the interrogated memory location, the RO status level may be repeated or the RI status level may be initiated, as described more fully hereinafter. During the RI status level, a character staticized in one of the memory registers MRR or MRL is reentered into the corresponding one of the memory sections HSML2 and HCMR4. The interrogation of the memory section continues with the operation switching between the RO and RI levels until the EQ circuit 86 is activated to apply a signal to the set input of the EQ flip-flop 90. The "1" output of the EQ flip-flop 90 primes the IC (instruction complete) status gate 114 (Fig. 2) in coincidence with the enabling level J. The timing pulse $t8a$ of the RI or the RO sequence is passed to the set input of the IC flip-flop 102. The "1" output of the IC flip-flop 102 is used to furnish an indication that the compression instruction has been completed.

The "1" output of the IC flip-flop may be used in generating a new instruction or in generating a shut-down signal for stopping the machine. Conveniently, the "1" output of the IC flip-flop may be used for generating a write-out-to-tape instruction. Such an instruction is described in the aforementioned Lowell S. Bensky application, Serial No. 478,021.

During operation, each instruction may be stored in a specified portion of the memory. An instruction may include a set of characters. Particular characters of the set are used for particular purposes in the machine. A system for storing and sequentially reading out instructions in and from a high-speed memory is described in the aforementioned Bensky, et al. Patent No. 2,679,638.

In the present invention, the instruction of interest is the compression instruction J used for controlling the compression operation. The set of characters representing the J instruction may be read to an instruction execution device such as the device 50 of the above-mentioned Bensky, et al. Patent No. 2,679,638. The first character of the set is applied to the flip-flops of an operation register (not shown) which may be a part of the instruction execution device. The output signals of the operation register are decoded in a crystal matrix, thereby raising the voltage level of the matrix output lead representing the J instruction. Suitable circuits are known in the art and the operation register and the matrix decoder are collectively represented in Fig. 4 by a single J flip-flop 152. The J flip-flop 152 may be reset by the "1" output generated by the IC flip-flop (Fig. 2) at the end of a previous instruction. The J flip-flop 152 remains set for the duration of the compression operation.

Certain options in programming the system operation are allowed the programmer. Certain of these options are permitted because of the three-address system used, and others of these options are "built-in" to the system to allow the programmer added flexability in handling the information. Among the options of interest in the present invention are those designated at the *a*, the *c*, the *d* and the R options. These options may be separately encoded as a part of the compression instruction and included in the set of characters read out of the memory to the instruction execution device. The signals representing the respective options are then staticized in suitable storage circuits, for example, respective ones of the flip-flops of a storage register termed herein the option register 164 of Fig. 4. The option register 164 may also be a part of the console unit. In such case, the respective options may be manually inserted before the start of the compression instruction. Each of the flip-flops of the option register 164 may be reset in parallel by a reset signal generated either manually or generated by the "1" output of the instruction complete flip-flop upon the termination of a preceding instruction.

The *a* option is used for selecting a desired one of the two memory sections. The "0" output of the *a* flip-flop is used: (1) in triggering the A counter 6 (Fig. 1) under the control of the A counter "and" gate 16, (2) in gating the address stored in the A counter 6 through the first HSML gates 24, and (3) in setting the RWL flip-flop 42 under the control of the RWL "and" gate 28. The "1" output of the *a* flip-flop (Fig. 4) is used; (1) in controlling the triggering of the B counter 10 (Fig. 1) under the control of the B counter "and" gate 20, (2) in gating the address set into the B counter through the first HSMR "and" gates 34 into the HSMR4 address register, and (3) in setting the RWR flip-flop 43 under the control of the RWR "and" gate 38.

The *c* option is provided for permitting the programmer to compress an entire message, or any portion of a given message. This option will be more fully described hereinafter. The *c* option is used in controlling the sequencing of the status levels. The "1" output of the *c* flip-flop (Fig. 4) is applied to two of the inputs of the set CAMO gate 170 (Fig. 2) via the first and second set CAMO "or" gates 166 and 168, respectively.

The *d* option is used on controlling the triggering of the C counter 8 (Fig. 1). The "1" output of the *d* option flip-flop (Fig. 4) is passed through a two-input "or" gate 172 (Fig. 1) to prime the C counter "and" gate 18. The output of the C counter "and" gate 18 is applied to the trigger input of the C counter 8 for advancing the count stored in the C counter one count each time this "and" gate is activated. The *d* option permits the programmer to piece portions of different messages together. For example, when parts of different messages are compressed and reassembled, the address required by the programmer is the next higher address to the last memory location interrogated during an RI status level.

The C counter 8 stores the last address interrogated during the RI status level when the *d* option flip-flop is reset. This address is important, for example, in reading out the compressed information to the external storage, where the programmer uses the last address to which data has been reentered. Thus, in practice, the last address interrogated during the compression operation is the first address interrogated in transferring the information to the external storage.

The R option is used to place the A, B and C address counters 6, 10 and 8 (Fig. 1) in either an add or a subtract mode. When the R option flip-flop (Fig. 4) is set, its "1" output primes the add inputs of the A, B and C address counters (Fig. 1). In the reset condition the "0" output of the R flip-flop primes the respective subtract inputs of the A, B and C address counters 6, 10 and 8. In the add mode, compression may be started beginning with the special symbol indicating the end of a message and continuing in an ascending fashion by successively addressing successive higher order memory locations. In the substract mode, compression may be started beginning at the special symbol indicating the start of a message and continuing in a descending fashion by sucsively addressing successive lower order memory locations.

One other option is of interest in the present invention. This last option is established by the zero and one states of the 11th stage ($2^{10}$) of the C counter 8 and is initially set into the C counter 8 along with the C address. The $2^{10}$ "0" output corresponds to the "0" output of the eleventh stage of the C counter and is used in gating the C counter address, stored in the first ten stages of the C counter 8, through the second HSML "and" gates 26 and the HSML "or" gates 22 into the address register (Ads) of the HSML 2. A WL (write left) "and" gate 30 is primed by the $2^{10}$ "0" output of the C counter 8; the output signal of the WL "and" gate 30 is used in controlling the second HSML "and" gates 26 and in applying a signal to the set input of the RWL flip-flop 42 through the RWL "or" gate 44. Similarly, the $2^{10}$ "1" output of the C counter 8 is used to prime a WR (write right) "and" gate 40 which controls the gating of the C counter address through the second HSMR "and" gates 36 and the HSMR "or" gates 32 to the address register (Ads) of the HSMR 4. The output of the WR "and" gate 40 is also applied to the set input of the RWR flip-flop 43 via the RWR "or" gate 45.

Consider, now, an example of one manner in which a stored message may be compressed. The composition of a message before and after compression, respectively, is illustrated in the following two lines:

*Message before compression*

SM . – –xx . xx– – . – – – – . – – . – –x–x– . – – – – . – – –EM .

*Message after compression*

SM . – –xx . xx . . . – –x–x EM .

Both these messages have the same information content although the number of memory locations has been reduced from 34 to 18. SM and EM represent the start and end message symbols, respectively. A period is used to represent an ISS (item separator symbol) which precedes each word (item). The dashes and x's in a word are used, respectively, to represent space symbols and information symbols in the various word positions. The space symbols are used to give a positive indication of the absence of an information character.

Note that the spaces between the least significant character of a word and the following ISS symbol and that both spaces and ISS symbols between the EM symbol and the first information character are removed in compressing the message. A word may contain a variable number of information characters from zero to some maximum number determined in advance for that word.

When the compression operation is selected, the A, B and C addresses are read into the A, B and C counters, 6, 10 and 8, (Fig. 1), respectively. Depending on whether information to be compressed is stored in HSML 2 or HSMR 4, one of the A and B counters addresses the starting address in the corresponding section of the memory; and the other of the A and B counters addresses the terminating address. The C counter addresses the initial location of the addresses to which the compressed information is to be transferred.

Assume that the message is stored in HSML 2, that is, the *a* option flip-flop is set furnishing a high level "1" output. Compression is conveniently started beginning with the end message symbol and terminating with the start message symbol. In such case all spaces to the right of the least significant character of a word and certain of the ISS symbols are removed. Thus, the address of the EM symbol is set into the A counter 6 and the address of the SM symbol is set into the B counter 10. In certain systems the EM symbol corresponds to the least significant address of the data to be compressed, the SM then corresponds to the most significant address of the data.

The C counter 8 address may be the same as, or different from, the address set into the A counter 6. If the two addresses are the same, the compressed message is returned to the same section of the memory with the EM locations of the compressed and uncompressed information being the same. The location of the SM symbol of the compressed message is stored in the C counter 8 at the end of the compression instruction. It is understood that the compression may begin at any given memory location, for example, the location of a desired one of the ISS symbols.

The R option flip-flop is also set placing the A, C and B counters in an add mode. Because the HSML 2 is selected, the $2^{10}$ flip-flop of the C counter 8 is reset furnishing a $2^{10}$ "0" output signal. The *c* option flip-flop remains reset because the particular compression operation is begun at the EM symbol of the message. The *c* option flip-flop is set only when compression is to begin at the SM symbol of a message. The *d* option flip-flop also remains reset since the compression is to be carried out over an entire message.

When the compression operation is selected, the J flip-flop is set and the "1" output of the J flip-flop 162 in coincidence with the timing pulse *t8a* of the preceding timing pulse cycle activates the RO01 status gate 104 (Fig. 2), thereby setting the RO01 flip-flop to establish the RO01 status level.

The coincidence of the J enabling level, the RO01 status level and timing pulse *t1* thereof activates the first reset CAMO gate 148, thereby causing the CAMO flip-flop 146 to be reset. The RO01 status level and the timing pulse *t2* thereof activates the EQ flip-flop "and" gate 92 (Fig. 1), thereby resetting the EQ flip-flop 90. The RO01 level in coincidence with the timing pulse *t8* thereof activates the RO04 status gate 106 (Fig. 2), thereby resetting the RO01 flip-flop via the "or" gate 144, and setting the RO04 flip-flop 96 to establish the RO04 status level.

The J enabling level in coincidence with the status level RO04 and timing pulse *t4* thereof activates the first set ISPL gate 154 (Fig. 2) thereby setting the ISPL flip-flop 152. The first RO status gate 108 is activated by the J enabling level in coincidence with the RO04 status level and the timing pulse *t8a* thereof, thereby resetting the RO04 flip-flop 96 and setting the RO flip-flop 98 to establish the RO status level. The RO status level and the timing pulse *t1* thereof in coincidence with the J enabling level and the "0" output of the *a* option flip-flop activates the RWL "and" gate 28 (Fig. 1), thereby gating the address of the EM through the first HSML "and" gates 24 and the HSML "or" gate 22 to the HSML 2 address register (Ads). The output of the RWL "and" gate 28 also sets the RWL flip-flop 42 by means of the RWL "or" gate 44.

The "1" output of the RWL flip-flop 42 is used in priming the read-write drivers of HSML 2. The timing pulse *t1* of the RO status level is passed through the equal circuit strobe gate 88 and samples the equal circuit 86 to determine whether the counts stored in the A and B counters are equal. No output is furnished by the equal circuit 86 at this time and the EQ flip-flop 90 remains reset furnishing an EQ "O" output level.

Figure 3:
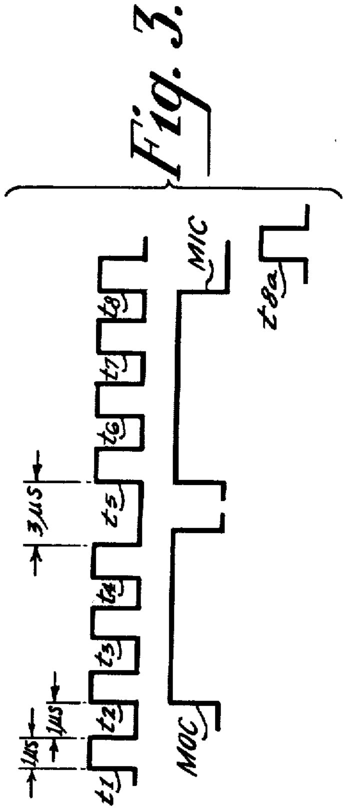
Fig. 3 is a timing diagram for various timing signals employed in the system of Fig. 1.

Beginning with the timing pulse *t2* and ending with the timing pulse *t4* of the RO status level, the timing signal MOC is present as illustrated in the timing diagram of Fig. 3. The MOC timing signal activates the MRO (memory read out) gate 62 of Fig. 1, thereby priming the MRL reset gate 64 and the first and second RLO gates 48 and 58 and the first and second ROR gates 54 and 60. Timing pulse *t2* of the RO status level is passed through the A counter "and" gates 16 to the trigger input of the A counter 6, thereby advancing the A counter to the next higher memory address. Timing pulse *t3* of the RO status level is passed through the MRL reset gate 64 to reset the MRL register 46.

During the timing pulses *t3* and *t4* of the RO cycle, the HSML 2 output is strobed and the EM symbol is gated from the HSML 2 activating the first and second ROL gates 48 and 58, respectively. The output of the first ROL gates is passed through the MRL "or" gates 50 into the MRL register 46. The output of the second ROL gates 58 is passed through the MRR "or" gates 56 into the MRR register 52. No further use is made of the EM symbol staticized in the MRR register 52 because the HSMR 4 is not operated under the conditions assumed for the present example. The information thus stored is used for other computer purposes, not important here.

The respective "1" and "0" outputs of the MRL register 46 are detected in the Not ISS, the Not SP and the Not EM code recognition gates 74, 76 and 78, respectively. The low-level voltage from the Not EM gate 74 is inverted in the inverter 84 and applied to one input of the reset CAMO gate 176 (Fig. 2). The high-level signals from the Not ISS and Not SP gates 76 and 78 of Fig. 1 are passed through the first and second set CAMO "or" gates 166 and 168 (Fig. 2), respectively. The latter two levels activate the set CAMO gate 170 (Fig. 2) in coincidence with the timing pulse *t7* of the RO status level and the enabling level J, thereby setting the CAMO flip-flop 146.

The Not SP level in coincidence with the timing pulse *t7* of the RO status level and the enabling level J activate a reset ISPL gate 174 thereby resetting the ISPL flip-flop 152. The "1" and the "0" output of the CAMO and the ISPL flip-flops 146 and 152, respectively, in coincidence with the timing pulse *t8a* of the RO status level and the J enabling level activate the RI status gate 112, thereby resetting the RO status level flip-flop 98 and setting the RI status level flip-flop 100. Timing pulse *t8* of the RO status level resets the RWL flip-flop 42 (Fig. 1).

The timing pulse *t1* of the RI status level in coincidence with the $2^{10}$ "0" output of the C counter 8 (Fig. 1) and the enabling level J activates the WL "and" gate 30, thereby gating the address stored in the C counter 8 through the second HSML "and" gates 26 and the HSML "or" gates 22 into the address register (Ads) of HSML 2. The output of the WL "and" gate 30 also sets the RWL flip-flop 42.

Timing pulse *t3* of the RI status level in coincidence with the EQ "0" output of the EQ flip-flop 90 (Fig. 1) activates the C counter "and" gate 18 advancing the count set in the C counter 8 by one count. Between the timing pulses *t5* and *t8*, the timing signal MIC is generated. The timing signal MIC, in coincidence with the status level RI and the enabling level J, activates an MRI (memory read-in) gate 72. The output of the MRI gate 72, in coincidence with "1" outputs of the set flip-flops of the MRL register 46, activate corresponding ones of the RIL (read-in left) gates 68. The outputs of the activated ones of the RIL gates 68 prime corresponding "and" gates (not shown) which are a part of the internal circuitry of HSML 2 and which are primed by the inhibit flip-flop of the HSML 2. For example, these last-mentioned "and" gates may be connected as shown in Fig. 5 of the above-mentioned Papian article. The inhibit flip-flops of the HSML 2 are set, for example, by the trailing edge of timing pulse *t5* and reset by the trailing edge of timing pulse *t7*. The write flip-flop of the internal memory is set, for example, by the leading edge of timing pulse *t6* and is reset by the leading edge of timing pulse *t7*. During the latter interval the EM symbol is written into the HSML 2 address corresponding to that initially set into the C counter 8.

The EM output of the inverter 84, in coincidence with the timing pulse *t7* of the RI status level and the enabling level J, activates the second reset CAMO gate 176 (Fig. 2) whose output is passed through the CAMO "or" gate 50 to the reset input of the CAMO flip-flop 46. By resetting the CAMO flip-flop 46, the RI status level is prevented from being again established until an information character is detected. The timing pulse *t8a* of the RI status level, in coincidence with the EQ "0" signal and the J enabling level, activates the second RO gate 110, thereby resetting the RI status level flip-flop 100 and setting the RO status level flip-flop 98.

During the second RO status level, the memory location at the next higher address from that of the EM symbol is addressed. It will be recalled that the timing pulse *t2* of the first RO status level advanced the A counter one count. The HSML 2 is interrogated at the next higher address and the space symbol (SP) stored therein is read out and staticized in the MIL register 46 in the manner described previously. The A counter is triggered to the next higher address by timing pulse *t2* of the second RO status level. Because the character next succeeding the EM symbol is a space, the output of the Not SP recognition gate 76 is at a low level. Accordingly, the set CAMO gate 170 (Fig. 2) is not activated due to the absence of the Not SP signal and the CAMO flip-flop 146 remains reset. An RI status level, therefore, is not established because the CAMO flip-flop is in a reset condition. Accordingly, the RO status level flip-flop 98 remains set and the RO status level sequence is repeated. The timing pulse sequence is repeated and the next succeeding memory address is interrogated and the character stored therein is gated out to the MRL register 46.

The operation proceeds in a manner already described for the first two RO status levels. Thus, at timing pulse *t1* of the RO sequence, the address of the next succeeding memory location is gated into the address register (Ads) of the HSML 2; at timing pulse *t2*, the A counter 6 is advanced by one count; and at timing pulse *t3*, the MRL register 46 is reset. The output of the next succeeding memory location is then staticized in the MRL register 46 during the presence of the MOC timing signal. In the example, the succeeding character is also a space and, therefore, the Not SP code recognition gate 76 furnishes a low-output level. Thus, the RO status level sequence is again repeated. Again, a space is read from HSML 2 and the RO sequence is continued with the A counter advancing by one count.

The next higher memory address stores an ISS symbol which is read out of the HSML 2 and staticized in the MRL register 46. In this case, the output level of the Not ISS recognition gate 74 is low. Therefore, the CAMO flip-flop 146 (Fig. 2) remains reset, because the set CAMO gate 170 is in a blocked condition, and the RO status level is continued.

The operation proceeds with successive higher memory addresses being interrogated until the first information character following the EM symbol is detected. In this case, the output level of both the Not ISS and the Not SP recognition gates 74 and 76 (Fig. 1) are high. Accordingly, the set CAMO gate 170 (Fig. 2) is activated by timing pulse *t7* of the RO status level, thereby setting the CAMO flip-flop 146. The timing pulse *t8a* of the RO status level activates the RI status gate 112 and thereby terminates the RO status level and establishes the RI status level.

The timing pulse *t1* of the RI status level sequence operates to gate the C counter 8 (Fig. 1) address into the address register (Ads) of the HSML 2 and to set the RWL flip-flop 42. The timing pulse *t3* of the RI sequence is passed through the C counter "and" gate 18 to the trigger input of the C counter 8, thereby increasing the count stored therein by one count. The timing signal MIC is generated and operates to gate the character from the MRL register 46 through the RIL gates 68 and into the memory location of the HSML 2 previously gated from the C counter 8 and staticized in the HSML 2 address register (Ads). Recall that this staticized address is the next succeeding address to that occupied by the EM symbol.

The timing pulse *t8a* of the RI sequence operates to activate the second RO status gate 110 (Fig. 2), thereby terminating the RI status level and establishing the RO status level.

The space symbol occupying the memory location next succeeding the first information character is read out from HSML 2 into the MRL register 46 (Fig. 1), as described heretofore. Since the CAMO flip-flop 146 (Fig. 2) is in a set condition, the RI status level is established by the timing pulse *t8a* of the RO status level. This space symbol, then, is reentered into the HSML 2 at the location succeeding that of the first information character returned to the HSML 2.

The next information character and the two succeeding space symbols are read out of, and reentered into, successive locations of HSML 2 in a similar fashion because the CAMO flip-flop 146 and ISPL flip-flop 152 remain set and reset, respectively.

The ISS symbol preceding the first word containing information characters further controls the operation of the CAMO and ISPL flip-flops in that, during the remainder of the compression operation, all succeeding item separator symbols are reentered into the memory. This control is exercised by the ISPL flip-flop 142 under the control of the second set ISPL gate 178. Thus, when an ISS symbol is staticized in the MRL register 46 (Fig. 1), the input of the second set ISPL gate 178 (Fig. 2) is primed. When the RI status level is established, the coincidence of the timing pulse *t1* thereof and the J enabling level activate the second set ISPL gate 178, thereby setting the ISPL flip-flop 152 via the ISPL "or" gate 156.

Subsequent read-in cycles are established under the control of the reset ISPL gate 174 which is activated only when an information character or an ISS symbol is detected. The output of the Not SP code recognition gate 76 (Fig. 1) is connected to one input of the reset ISPL gate 174 (Fig. 2). Thus, all succeeding ISS symbols cause the ISPL flip-flop 152 to be reset, thereby establishing an RI status level for reentering the ISS symbols in the addresses of the HSML 2 designated by the C counter 8. However, the spaces located to the right of the least significant information character of a word are still discarded because the ISPL flip-flop remains in a set condition until the first information character following each succeeding ISS symbol is detected during an RO status level.

The compression operation terminates when the A and B counters 6 and 10 store equal counts. The A counter is advanced one count during each RO status level. Thus, the counts stored in the A and B counters 6 and 10 are equal in the present example when the SM location symbol of the message is addressed. Accordingly, the last RO status level occurs when the A counter 6 holds the address of the SM symbol. Timing pulse *t1* of the last RO sequence activates the equal circuit strobe gate 88 (Fig. 1). The output signal of the equal circuit strobe gate 88 is passed by the equal circuit 86. The output signal of the equal circuit 86 is applied to the set input of the equal flip-flop 90 (Fig. 1) to raise the voltage level on the EQ "1" output.

The last RO status level is followed by a final RI status level because the ISPL flip-flop 152 (Fig. 2) is reset due to the high-level output of the Not SP recognition gate 76 (Fig. 1). The SM symbol is reentered in the HSML 2 at the address staticized in the C counter 8 during the last RO status level. Timing pulse *t8a* of the final RI status level sequence activates the IC status gate 114 (Fig. 2) which is primed by the EQ "1" level, the J enabling level and the RI status level via the first and second IC "or" gates 179 and 181. The output of the IC status gate 114 resets the RI flip-flop 100 and sets the IC status flip-flop 102. The "1" output of the IC flip-flop 102 is used to indicate that the compression operation is completed. The computer may then proceed to carry out other operations not important here.

The IC status gate 114 (Fig. 2) may also be activated during the RO status level under certain other conditions. One condition, for example, includes the situation where all the memory locations between the least and the most significant addresses contain only SP and ISS symbols. In such case, the first RO status level is followed by a first RI status level when the EM symbol is returned to the memory. However, the first RI status level is followed by a continuous series of RO status levels because the intervening memory locations all have ISS or SP symbols stored therein. The CAMO flip-flop 146 is reset when the EM symbol is reentered into the memory and remains reset during the series of RO status levels. During the RO status level corresponding to the SM symbol, the EQ flip-flop 90 (Fig. 1) is set. The IC status gate 114 (Fig. 2) is then primed by the coincidence of the EQ "1" level, the J enabling level, the CAMO "0" level via the second IC "or" gate 181 and the RO status level via the first IC "or" gate 179. Timing pulse *t8a* of the last RO cycle then activates the IC status gate 114 to reset the RO status level flip-flop 98 and to set the IC status level flip-flop 104.

A flow diagram illustrating the conditions for establishing the various status levels is shown in Fig. 5. The flow diagram of Fig. 5 provides a shorthand description of the compression operation for various conditions. For example, when the RO level is established, it may be continued in accordance with the status of the CAMO and the ISPL flip-flops 146 and 152 (Fig. 2), whether or not the counts set in the A and B counters 6 and 10 (Fig. 1) are equal. For example, the system goes from the RO status level to the IC status level, when the CAMO flip-flop 146 is set, and the counts stored in the A and B counters 6 and 10 are equal. The system returns to the RO status level, when the CAMO and ISPL flip-flops 146 and 152 are respectively reset and set, and the counts stored in the A and B counters 6 and 10 are unequal. The system goes from the RO status level to the RI status level when the CAMO and ISPL flip-flops are respectively set and reset. From the RI status level, the system operation can return to a RO status level or proceed to the IC status level, depending upon the condition of the A and B counters 6 and 10. When the counts stored in the two counters are unequal, a new RO status level is established; when the counts stored in the two counters are equal, the IC status level is established.

If the information to be compressed is contained in the HSMR 4, the status level sequencing is the same. The starting memory address is set into the B counter 10 (Fig. 1) and the terminating memory address is set into the A counter 6. When the HSMR 4 is selected the *a* and the *c* flip-flops of the options register 164 (Fig. 4) are set. The "1" output of the *a* flip-flop controls the triggering of the B counter 10 (Fig. 1) during each RO status level. The *a* "1" level is applied to one input of the B counter "and" gate 20. The address initially stored in the A counter 6 is not changed because the A counter "and" gate 16 is now closed. Each character read out of HSMR 4 during an RO cycle is gated through the second ROR gates 60 under the control of the MRO gates 62 and is staticized in the MRL register 46. The character read out of HSMR 4 is also staticized in MRR 52 via the first ROR gates 54 and the MRR "or" gates 56. The code recognition gates 74, 76 and 78 detect the character staticized in MRL 46 as before, and one of the status levels is selected as previously described. The address staticized in the C counter 8 (Fig. 1) is gated into the address register (Ads) of the HSMR 4 due to the $2^{10}$ "1" output priming the WR "and" gate 40 and the RWR flip-flop 43. The character staticized in the MRR 52 is then gated into the HSMR 4 at the address previously set into the C counter 8. The HSML 2 is not activated due to the $2^{10}$ "0" output being low and, therefore, blocking the WL "and" gate 30.

When the *d* option flip-flop (Fig. 4) is reset, the timing pulse *t3* of each RI status level sequence, excepting the final RI status level, activates the C counter "and" gate 18. Prior to the final RI status level the EQ flip-flop 90 is set and the EQ "0" level is low, thus the C counter "and" gate 18 is blocked during the final RI status level. That is, when the *d* "1" output level of the *d* option flip-flop is low, the C counter 8 is controlled by the EQ flip-flop 90. And, when the compression operation is terminated, the C counter 8 stores the address of the SM (start message) symbol of the compressed message. By other suitable operations, the programmer may have the address of the SM symbol stored in another specified memory location for use at some later time, or the programmer may cause the compressed message to be read out to the external storage device beginning with the SM symbol. Operations similar to the two last-mentioned operations are described in the aforementioned Bensky application, Serial No. 478,021 as the set up (P) and refer (Q) operations, respectively.

By employing the *d* option, the programmer can piece together various messages or portions of messages into a larger message. For example, if the *d* option flip-flop (Fig. 4) is set, its *d* "1" output level is high. Accordingly, a count of one is added to that stored in the C counter 8 during each RI status level, including the final RI status level. Thus, upon the termination of the final RI status level the C counter stores the address succeeding the last address written into during the compression operation. The succeeding address is the one desired by the programmer when assembling data from different memory sections. Thus, the first compression instruction can be followed by a second compression instruction which sets the A and B counters 6 and 10 according to the starting address of data in one of the memory sections. The subsequently compressed information is then reentered beginning at the address last stored in the C counter 8. In this fashion, the programmer can assemble and compress various data stored in different parts of the memory sections. The *d* option flip-flop may be reset during the last compressing instruction of a sequence of compression instructions, wherein the C counter then stores the initial address for the rearranged information.

If desired, compression can be carried out by addressing successive memory locations in a descending fashion. In this case, the R option flip-flop (Fig. 4) is reset and the *c* option flip-flop is set. The R "0" output then changes the A, B and C counters 6, 10 and 8 (Fig. 1) to a subtract mode. The *c* "1" output of the *c* option flip-flop is applied to two of the inputs of the set CAMO gate 170 (Fig. 2) via the first and second set CAMO "or" gates 166 and 168, respectively. Conveniently, the first memory location to be addressed may be that storing the SM symbol of a message, and the terminal address may be that storing the EM symbol of a message. For this variation, each time the RO status level is established a signal is applied to the set input of the CAMO flip-flop 146. Because the first character read out of the memory is the SM symbol, the ISPL flip-flop is reset and an RI status level is established. The first ISS symbol following the SM symbol is detected by the Not ISS gate 74 (Fig. 1) and the output of the inverter 80 is passed through the second set ISPL gate 178 (Fig. 2) during the RI status level and via the ISPL "or" gate 156 to the set input of the ISPL flip-flop 152. Accordingly, subsequent spaces are not reentered into the memory until an information character is detected. The ISPL flip-flop 152 is then set at timing pulse *t7* of the RO sequence via the reset ISPL gate 174. The ISPL flip-flop 152 remains reset until the next ISS symbol is detected. Thus, after the first information character is detected, any spaces between the first information character and the next ISS symbol are reentered into the memory as they occur. The next ISS symbol detected is reentered and operates to again set the ISPL flip-flop 152, and so on. Thus, by exercising the R and *c* options in the above manner, compression is begun at the most significant character of the information, and all spaces located between the ISS symbol preceding a word and the first information character of that word, if any, are eliminated.

Upon the termination of the compression operation the C counter stores the least significant address of the compressed information. A series of compression cycles can be used to piece together entire messages, or portions of messages, by additionally exercising the *d* option as described previously. All spaces excepting those between information characters can be eliminated by two compression operations. The first compression operation would commence with the most significant character of an information unit, and the second compression operation would begin with the least significant character of the information unit.

There has been described herein an improved system for rearranging information stored in the internal memory of a machine. The flexibility in the placement of the information thus rearranged permits ease of programming and increases the speed of operation of the system. The present invention is particularly advantageous where it is desired to read out information stored in the internal memory to a magnetic tape or other moving storage means. In the case of magnetic tape, for example, the tape continues running even though no significant information is being read out of the internal memory. Thus, a considerable saving in the length of tape required to store a given amount of data can be achieved if the information in the internal memory is first rearranged in a compact form. Note, also, that the internal memory operation can be carried out in the order of microseconds. However, the recording of information on magnetic tape is usually in the order of milliseconds. Consequently, there need be no delay in reading out the information to the magnetic tape because of the compression operation.

What is claimed is:

1. In a memory system having memory locations and means for storing separate ones of a plurality of characters in separate ones of said memory locations, the combination comprising means for reading out signals representing said characters from a desired plurality of said locations one character at a time, means for reentering certain ones of said character-representing signals one at a time into selected ones of said locations with successively reentered characters being placed in successive memory locations, and means for recognizing one kind of said characters read out and for inhibiting the reentry of certain ones of said characters of said one kind in response to said recognizing means.

2. In a memory system having memory locations and means for storing separate ones of a plurality of characters in separate ones of said memory locations, means for reading out signals representing said characters from a desired successive plurality of said locations one character at a time, means for reentering certain ones of said character-representing signals one at a time into selected ones of said locations with successively reentered characters being placed in successive memory locations, means for recognizing one kind of said characters read out and for inhibiting the reentry of certain ones of said characters of said one kind in response to said recognizing means, and staticizing means for storing the address of the last location receiving one of said reentered characters.

3. In a memory system having memory locations and means for storing separate ones of a plurality of characters in separate ones of said memory locations, means for reading out signals representing said characters from a desired successive plurality of said locations one character at a time, means for reentering certain ones of said character-representing signals one at a time into selected ones of said locations with successively reentered characters being placed in successive memory locations, means for recognizing one kind of said characters read out and for inhibiting the reentry of certain ones of said characters of said one kind in response to said recognizing means, staticizing means for storing the address of a location receiving one of said reentered characters, and means responsive to the reentry of a character into one of said locations for advancing said staticizing means.

4. In a memory system having memory locations and having means for storing a plurality of characters of different kinds in a plurality of said locations, the combination comprising means for locating a first and second of said locations, means for successively reading out signals representing said characters, said readout beginning at said first location and terminating at said second location, means for locating a third of said locations, means for reentering certain ones of said character-representing signals one at a time into said locations with successively reentered characters being placed in successive locations beginning at said third location, and means for recognizing one kind of said characters read out and for inhibiting said reentry of certain ones of said characters of said one kind in response to said recognizing means.

5. A memory system as recited in claim 4 wherein said one kind of characters include space characters and item separator characters, and wherein said certain characters whose reentry is inhibited include those initially located between said first location and the first succeeding location having a character of a kind different from said one kind.

6. In a memory system having first and second memory sections having memory locations therein and having means for storing separate pluralities of characters of one kind and a kind different from said one kind in separate pluralities of said locations in said first and second sections, a system comprising means for locating a first and a second memory location in one of said first and second sections, means for successively reading out signals representing characters from the locations between said first and second locations inclusively, means for reentering certain ones of said character-representing signals one at a time with successive reentered characters being placed in successive memory locations beginning with said first location, and means for recognizing characters of said one kind upon said read-out and for inhibiting the reentry of certain ones of said one kind of characters in response to said recognizing means.

7. In a memory system having first and second memory sections having memory locations and having means for storing separate pluralities of characters in separate pluralities of said locations in said first and second sections, means for locating a first and a second location in one of said first and second sections, means for successively reading out character-representing signals one at a time from the locations between said first and second locations inclusively, means for locating a third location in one of said first and second sections, means for reentering certain ones of said character-representing signals one at a time with successively reentered characters being placed in successive locations beginning at said third location, and means for recognizing certain kinds of the characters read out and for inhibiting the reentry of certain characters of one kind in response to said recognizing means.

8. A compression system for operation with a memory having memory locations and having means for storing messages in a plurality of said locations wherein each of said messages includes one or more items and wherein each of said items has a varying number of information characters, said messages and said items being separated by one kind of character, said system comprising means for locating a desired one of said one kind of character, means for interrogating successive ones of said memory locations starting with that of said located character, means coupled to said memory for recognizing signal combinations read out from said memory, means for reentering said read-out signal combinations one at a time to successive ones of said memory locations, and means responsive to said recognizing means for inhibiting the reentry of all signal combinations read out between said located character and a succeeding information character.

9. In a memory system having memory locations and having means for storing at least one message in a plurality of said memory locations, said message being preceded by one kind of character and including one or more characters of said one kind and a kind different from said one kind, a compression system comprising means for reading out signals representing said characters from said plurality of memory locations one location at a time, separate means responsive to said read-out signals for recognizing signal combinations representing said characters, means for reentering certain ones of said character-representing signals to a different plurality of said memory locations with successive ones of said reentered characters being placed in successive memory locations in said different plurality, and means responsive to the first recognition of said one kind of character by said recognizing means for inhibiting the further reentry of all said one kind of character until the recognition of a character of said different kind of said recognizing means.

10. In a memory system having a plurality of characters of different kinds stored in a plurality of memory locations, the combination comprising first addressing means for reading out signals representing said characters from a desired successive plurality of said locations one character at a time, second addressing means for reentering certain ones of said character-representing signals into said locations one at a time with successive reentered characters being placed in successive locations, means for recognizing one kind of said characters read out and for inhibiting said reentry of certain ones of said one kind of characters in response to the prior recognition of a character of said one kind by said recognizing means, and means for advancing said first addressing means each time character-representing signals are read out and from said desired plurality of locations, and means for advancing said second addressing means each time character-representing signals are reentered into said locations.

11. In a memory system having memory locations and having means for storing a plurality of characters in a plurality of said locations, the combination comprising first and second counting means for addressing said memory locations, means controlled by said first counting means for reading out character-representing signals from said plurality of memory locations, means for reentering certain ones of said character-representing signals into successive memory locations one location at a time, means for recognizing said read-out signals representing one kind of said characters and for inhibiting the reentry of said read-out signals representing certain ones of said characters of said one kind, and means jointly controlled by said first and second addressing means for terminating said read-out and said reentry of character-representing signals.

12. In a memory system having memory locations and having one or more items stored in a plurality of said memory locations wherein each of said items includes one or more information characters and wherein each item is preceded by a special character, a compression system comprising means for reading out signals representing said characters from a desired plurality of said memory locations one location at a time, separate means responsive to said read-out signals for recognizing those representing said information and said special characters, means for reentering certain ones of said character-representing signals to a different plurality of said memory locations one character at a time, and means responsive to said recognizing means for inhibiting the reentry of all signals between those representing a special character and those representing the first succeeding information character of each of said items.

13. A compression system for operation with a memory having memory locations and having means for storing messages in a plurality of said locations, each of said messages including one or more items and each of said items having a varying number of information characters, said messages and said items being separated by one kind of character, said system comprising means for locating a first one of said characters of said one kind, means for reading out character-representing signal combinations from successive ones of said locations starting with that of said located character, means coupled to said memory for recognizing signal combinations read out from said memory, means for reentering said read-out signal combinations one at a time to successive ones of said locations, and means responsive to said recognizing means for inhibiting the reentry of all signal combinations read out between each character of said one kind and its succeeding information character.

14. A compression system for operation with a memory having memory locations and having means for storing messages in a plurality of said locations, each of said messages including one or more items and each of said items having a varying number of information characters and wherein each of said messages and each of said items is separated by one kind of character, said system comprising means for locating a first one of said characters of said one kind, means for interrogating successive ones of said locations starting with that of said located special character, means coupled to said memory for recognizing signal combinations read out from said memory, means for reentering said read-out signal combinations one at a time to successive ones of said locations, means responsive to said recognizing means for inhibiting the reentry of all signal combinations read out between said located character and the first succeeding information character and all signal combinations between each character of the said one kind and its succeeding information character.

15. A compression system for operating with a memory having memory locations and having means for storing a grouping of characters including information characters and special characters in a plurality of said locations, said system comprising reading means for interrogating a desired part of said locations successively, each of said interrogated locations furnishing a combination of signals, character-recognition means coupled to said memory, said recognition means being operative to furnish one output signal in response to signal combinations representing information characters and another output signal in response to signal combinations representing special characters, and means operative in response to said recognition means output signals to reenter said read-out signal combinations to successive memory locations and to inhibit said reentry of certain ones of said signal combinations representing said special characters.

References Cited in the file of this patent

UNITED STATES PATENTS

| | | |
|---|---|---|
| 2,672,944 | Minton | Mar. 23, 1954 |
| 2,719,965 | Person | Oct. 4, 1955 |
| 2,770,797 | Hamilton et al. | Nov. 13, 1956 |

UNITED STATES PATENT OFFICE

CERTIFICATE OF CORRECTION

Patent No. 2,853,698

September 23, 1958

David L. Nettleton et al.

It is hereby certified that error appears in the printed specification of the above numbered patent requiring correction and that the said Letters Patent should read as corrected below.

Column 5, line 62, for "Not SP)" read -- "Not SP" --; column 6, line 14, for "rceognition" read -- recognition --; line 28, for "thte" read -- the --; column 19, line 33, for "of", second occurrence, read -- by --.

Signed and sealed this 3rd day of February 1959.

(SEAL)
Attest:

KARL H. AXLINE
Attesting Officer

ROBERT C. WATSON
Commissioner of Patents